United States Patent [19]

Tabatabai

[11] Patent Number: 5,249,775
[45] Date of Patent: Oct. 5, 1993

[54] CLOSURE

[76] Inventor: Seyed H. Tabatabai, 19 Robinson Court, St. Mary's Path, Islington, London N1 2RU,, United Kingdom

[21] Appl. No.: 835,936
[22] PCT Filed: Aug. 16, 1990
[86] PCT No.: PCT/GB90/01297
§ 371 Date: Feb. 14, 1992
§ 102(e) Date: Feb. 14, 1992
[87] PCT Pub. No.: WO91/02914
PCT Pub. Date: Mar. 7, 1991

[30] Foreign Application Priority Data

Aug. 16, 1989 [GB] United Kingdom ............. 8918741.3

[51] Int. Cl.$^5$ ................................. F16K 1/36
[52] U.S. Cl. ................... 251/330; 251/312; 251/356; 251/77
[58] Field of Search ............ 251/330, 312, 308, 332, 251/356, 77

[56] References Cited

U.S. PATENT DOCUMENTS

| | | |
|---|---|---|
| 941,652 | 11/1909 | Rock ................... 251/330 X |
| 1,452,811 | 4/1920 | Mueller . |
| 2,876,987 | 3/1959 | Renfro ................. 251/312 X |
| 3,081,792 | 3/1963 | Hansen ................. 251/308 |

FOREIGN PATENT DOCUMENTS

| | | |
|---|---|---|
| 45910/74 | 10/1966 | Australia . |
| 61106/80 | 8/1980 | Australia . |
| 1351077 | 12/1963 | France . |
| 7633005 | 6/1977 | France . |

Primary Examiner—Arnold Rosenthal
Attorney, Agent, or Firm—Blum Kaplan

[57] ABSTRACT

A stop valve assembly comprises two closure members one for stopping substantive gas or liquid flow and the other to prevent leakage along a spindle section 33. Each member possesses a closure element in the form of a rigid disc-like member (9 or 34) of accurately predetermined thickness lying in a recess (1 or 3) formed round the end opening of a duct or around the spindle section and having exactly the same depth as the thickness of the disc. Over the disc outer surface 11, and the end face around the recess is located a flat annular deformable seal member (14, 64); this can be secured at in relation to the disc member, so as to travel with the disc member 9 as a stop valve, or can be secured against the said face around the recess so as to define an antileakage spindle seal. Since no deformed seal is used and since no packing is used in the screw spindle mechanism, high actuating force is unnecessary. The assembly can be operated with a minimum of force to maintain pressures of hundreds or even thousands of pounds per square inch.

18 Claims, 4 Drawing Sheets

CLOSURE

This invention relates to closures for preventing gas or liquid flow, and particularly but not exclusively to stop valves and shaft seals.

In many types of conventional valve, a torque is applied to a spindle, in order to press a closure member against a sealing seal. The magnitude of the torque required is much greater than the pressure of the flow which is being controlled. Furthermore, even if the pressure of the flow remains unchanged, but the surface area of the seal and seat increase, the force required to operate the closure member will increase by several times. As a result, as the pressure of the flow and the diameters of the inlet and outlet to the valve increase, it becomes essential that components of the valve should be made to be stronger. Accordingly, a heavier valve body and a stronger spindle are required, and also, a heavy-duty packing gland is used. However, it is impossible to ensure that when the pressure of flow increases, the valve will not leak. In addition when a conventional valve, such as the one described above is used, the packing gland has to be repacked after use, or the valve will leak.

Furthermore, a conventional valve having more than 100 mm gate diameter requires a gear box or a powerful motor to operate the valve, and as the size of the valve increases, control of the valve becomes more difficult. This particular problem is essentially caused by the pressure of the flow, the size of the inlet and outlet to the valve and the stiffness of the packing gland.

The present invention sets out to provide a closure suitable for use in valves, seals, shaft seals and other pressure systems, wherein no pressure means are required to press the sealing elements of the closure against a sealing seat, and no shaft packing material needs to be used. Furthermore, the invention sets out to provide a closure which may be relatively large, but may be operated by a relatively small drive spindle without the use of a gearbox or a motor.

According to one aspect of the present invention there is provided a closure for a gas or liquid system, capable of use as a stop valve component over a wide range of pressures in the system and as an anti-leakage seal, and comprising an outlet for the gas or liquid, and a closure element locatable to seat and seal in and around the said outlet, in which: the outlet comprises a shoulder recess formed in a face, the effective base of the recess and the said face being parallel and at accurately predetermined spacing; and the closure element comprises (a) a rigid disk-like member of accurately predetermined thickness to lie within a recess with an outer face exactly coplanar with the said face and (b) a flat or sheet-like deformable seal member held so as to lie on the said outer face of the disk and on the first said face.

In one preferred embodiment of the present invention the deformable seal member is attached in use to the rigid disk-like member, and the closure element thus constituted is movable with its disk-like member passing into or out of the recess to constitute a stop valve element for closing a duct opening through the base of the recess.

In a further preferred embodiment of the present invention, the deformable seal member is attached in use to the first-mentioned face and the closure thus constituted locates to constitute a sealing element, e.g. a shaft or spindle seal.

In the case of a shaft or spindle seal, it will usually be important to ensure that the components of the seal are not subjected to any significant axial force. Accordingly, it may be desirable that the region of the shaft of spindle provided with a seal embodying the invention is coupled to the remainder of the shaft of spindle, or to associated components, by couplings permitting axial relative movement while ensuring transmission of rotation, for example splines, square or hexagonal tees, and so on.

According to the present invention there is also provided a stop valve assembly comprising (a) as a stop valve element for the gas or liquid flow, a closure in one form as described above, and (b) as a sealing element to prevent leakage from the stop valve assembly, a closure in the other form as described in the preceding paragraph.

In a preferred embodiment the stop valve assembly comprises a housing, a transverse stationary web with an internally threaded axial bore within the housing, an axially movable unpacked threaded carrier located in the bore, and having a rearwardly open axial key opening, and an operating spindle with an axial key end to fit within said carrier opening: the disk-like member of the stop valve element being attached to an inner end of said carrier, whereby rotation of the spindle rod causes the disk-like member to enter or leave its recessed duct end; and the disk-like member of the sealing element seals gas or liquid passing the unpacked thread of the carrier from escaping rearwardly along the spindle surface.

The closure member according to the present invention is versatile, non-leaking and and self-pressure adjusting. Accordingly, unlike other closure members which are designed for specific tasks, this closure member has a wide variety of applications, and may be used in many ways without requiring a large degree of reconstruction or a substantial number of additional components. The stop valve according to the present invention may be very large and yet still be operated by a relatively small spindle section and without the use of a gear box or a motor.

Embodiments of the present invention will now be described by way of example and with reference to the accompanying drawings in which.

Figure 1:
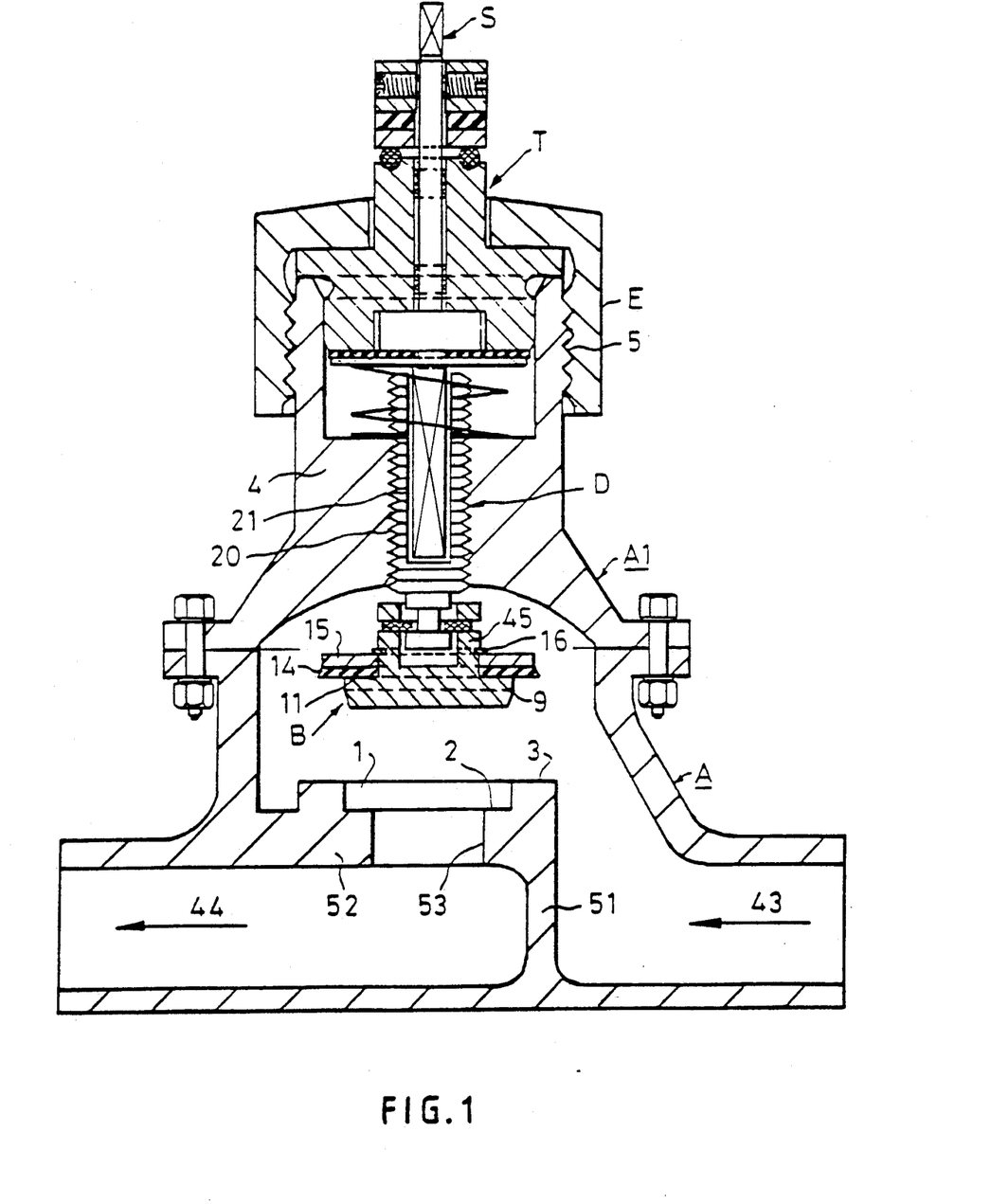
FIG. 1 shows a cross-sectional view of a stop valve assembly in an open position.
Figure 2:
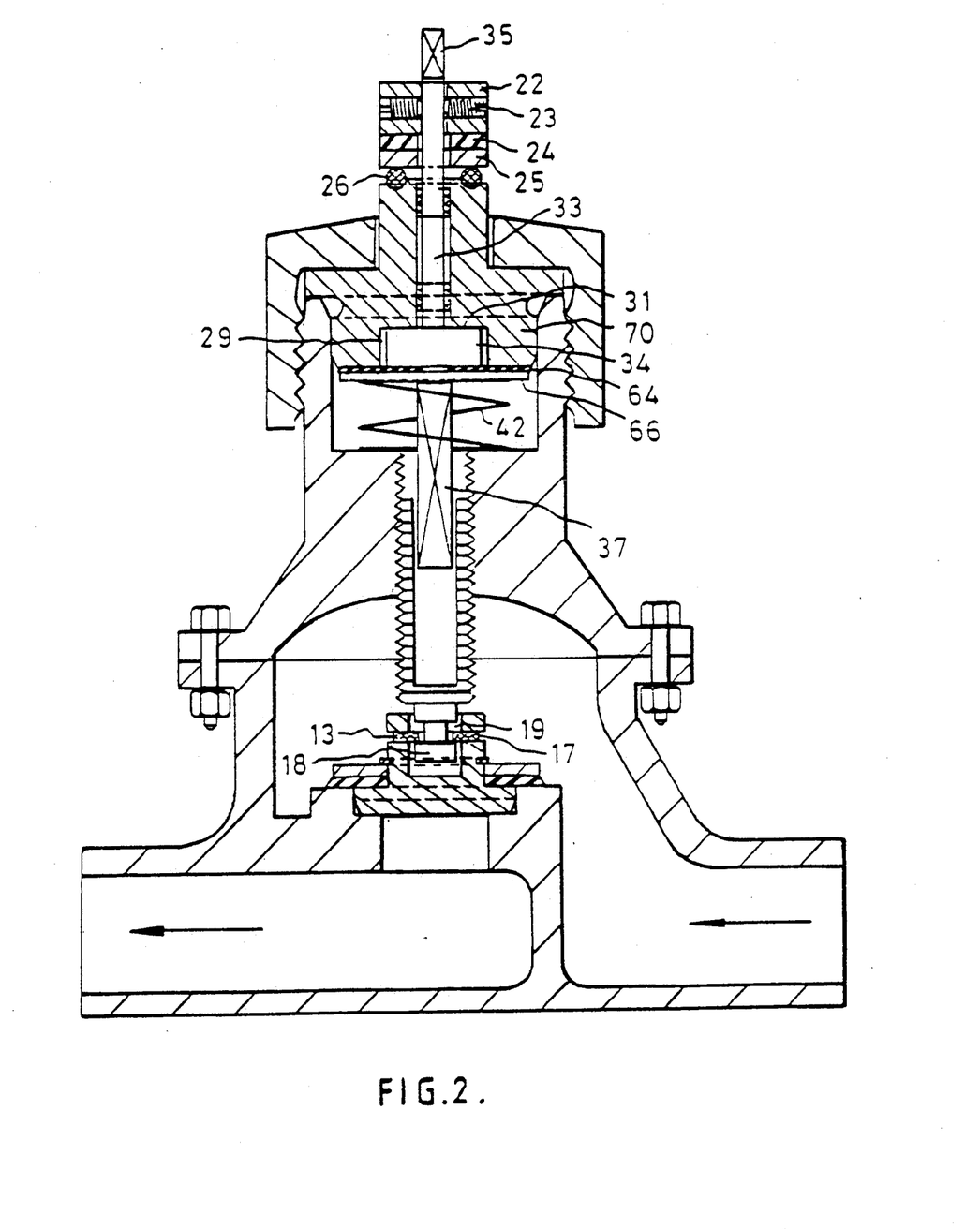
FIG. 2 shows a cross-sectional view of the stop valve assembly shown in FIG. 1, in the closed position.

FIGS. 1 and 2 show a stop valve comprising a valve body A with an inlet 43 and outlet 44 and including a bolted-on cover A1. The inlet and outlet are separated by a vertical wall 51 and a horizontal wall 52. In the wall 52 there is a bore 53, at the upper end of which is a counter-bore defining a recess 1, with a shoulder between the base of the recess 1 and the bore 53, which shoulder defines a plane horizontal primary seat 2.

Encircling the recess 1, is a further plane surface parallel to the surface of the seat 2, defining a secondary seat 3. The seats 2, 3 are accurately parallel to one another and at an accurately predetermined spacing.

The bore 53 can be closed by a plunger or sealing head B carried on the lower end of a screw-threaded plunger shank D which is threaded in a screw-threaded bore in the upper valve body portion A1. Rotation of the shank D will raise or lower the sealing head or plunger B away from or towards the valve seats 2, 3. The latter is rotatable relative to the shank D.

For rotating the shank D, a spindle unit T is mounted on the valve body by a cap nut E and includes a spindle S which can be rotated but cannot move axially.

At the top of the valve body there is an external screwthread 5 for the cap nut E, and inside the valve body there is an internal flange with the threaded bore for the shank D. The cap nut holds a spindle casing 70 on the top of the valve body.

The valve head or plunger B includes a primary sealing element in the form of a rigid disk-like member 9 with plane parallel surfaces and of an accurately predetermined thickness. The primary sealing element 9 is so configured as to be insertable into the recess 1. The rigid disk-like member 9 has exactly the same thickness as the depth of the recess 1.

Consequently, when the disk-like member 9 is inserted into the recess 1 so as to abut on the seat 2, the upper surface 11 of the disc 9 is coplanar with the end face or secondary seat 3 of the duct, as can be seen in FIG. 2.

Over the upper surface of the disk 9, and the end face 3 of the duct, is disposed a flat annular deformable seal member 14, e.g. of sheet rubber.

Over the deformable seal member 14, which constitutes a secondary sealing element, there is placed a clamping disk 15 which is made of a rigid material and is of larger diameter than the element 9. The clamping disk 15 serves to hold the secondary sealing element 14 against the primary sealing element 9 in order that the two sealing elements travel together. The clamping disk 15 is held in position by a circlip 16 which is inserted in a groove in a rear extension 45 of the primary sealing element 9.

The nose of the plunger shank D comprises a circumferential groove 19 which, when the nose is inserted into a deep recess provided in the rear extension 45, corresponds to the position of a pair of parallel grooves 13 in the wall of the rear extension 45. Hence, the plunger shank is held within the recess in the rear extension by means of a "U" clip 17 which is inserted into the grooves 13, and also the groove 19 in the plunger shank. The plunger is prevented from coming out of the recess in the rearward extension of the primary sealing element 9 due to its retaining end 18, which has a diameter substantially greater than that of the internal opening in the "U" clip 17. As a result the plunger B can rotate and "float" relative to the shank D.

The plunger shank D also comprises an external thread 20 and a keyway 21 through its centre to receive a driving key 37 on the valve spindle.

With the above configuration, by rotation of shank D the primary element 9 is insertable into the recess 1 so as to substantially seal the bore 53. As the fluid pressure on the outlet duct side of the plunger B becomes less than that on the inlet side, the secondary sealing element 14 is forced, by the fluid pressure difference, against the end face 3 of the duct, to effectively complete the seal. As the surface 3,11 are coplanar, and only a small gap exists between member 9 and seat surface 3, the sealing element 14 is subjected to little stress and lies essentially flat and undeformed.

The primary seal element or disk 9 provides mechanical support for the secondary seal element 14, except at the narrow gap between the edge of the element 9 and the lip of the recess 1. The primary element also forms a metal/metal seal at the base of the recess, trapping a volume of fluid between the side of the recess and the side of the primary element 9 under the secondary sealing element 14, thereby further reducing stressing of the deformable element 14 by the applied pressure. This construction has been found capable of resisting very high fluid pressure with substantially zero leakage.

In some circumstances it may be desirable to provide grooves in the base of the recess, to accommodate occasional particles which may arrive in the liquid flow, and prevent these particles from affecting the integrity of the seal. However this modification reduces the pressure that can be withstood, because it means that there is no longer a volume of fluid trapped within the recess under the deformable element 14 as mentioned above.

The valve also incorporates another embodiment of a closure member according to the present invention, used as an anti-leak spindle seal. In this case, the primary sealing element is in the form of an annular flange 34 about an operating spindle shaft section 33. The primary sealing element 34 is of the same thickness as the depth of a recess 29 disposed in the spindle casing 70. The closure member further comprises a secondary sealing element 64 which is in the form of a flat deformable seal member or disc e.g. of rubber. When the closure member is assembled, the spindle section 33 extends through an opening in the spindle casing 70, and the primary sealing element 34 lies in the recess 29 with its lower surface coplanar with the lower surface of the spindle casing 70. The spindle section also extends through the secondary sealing element 64 which is disposed on the opposite side of the primary sealing element to the recess 29. The secondary sealing element 64 abuts the lower surface of the primary sealing element 34 and the lower surface of the spindle casing, these surfaces together forming a secondary seat. In this embodiment, the primary sealing element 34 and the secondary sealing element 64 are not fixed together, but the primary sealing element and the spindle section 33, which are integrally formed, can rotate within the recess 29 whilst the secondary sealing element 64 remains stationary. The secondary sealing element is held against the spindle casing 70 by means of a metallic disc 66 and a spring 42, or the disc 66 may be held in place on the spindle casing 70 by screws.

The primary sealing element 34 substantially seals the opening in the casing 70, and the secondary sealing member 64 lying against the coplanar lower surfaces of the members 34 and 70 completes the seal. The force required to press the disc 34 against the base of the recess 29 is applied by the pressure of the fluid flow itself.

A bush 22 is secured to the spindle section 33. This retains the spindle section in position. The spindle section 33 is housed within casing 70, and is inserted into a bore which is coaxially disposed within the bush. The bush further comprises threaded holes, perpendicular to the bore, and associated screws 23 which when tightened abut against the spindle section 33, and hold it in position within the bush 22. A soft or resilient element for example on rubber disk 24 with a hole through its centre is disposed around the spindle section below the bush. This rubber disk serves as a shock-absorber and to maintain contact between the various components on the spindle. Below the rubber disk 24 there is disposed a metallic disk 25 so as to sandwich the rubber disk 24 between itself and the bush. A key 35 on the projecting end of the spindle enables a hand wheel to be fitted.

Below the metallic disk 25 are disposed a number of ball-bearings 26 which are used to reduce friction as the spindle section 33 is rotated. These bearings serve to make rotation of the spindle section smooth.

Below the ball-bearings is the casing 70. The casing 70 comprises a central bore, through which the spindle section 33 extends; the central bore may be sufficiently wide to allow bearings or bushes to be disposed between the sides of the bore and the spindle section, or the bore may have simple through holes. Optionally an O-ring is provided to seal the neck of the casing 70 in the top of the valve body, the casing 70 having a circumferentialgroove for this O-ring.

The spindle which comprises the spindle section 33, the disc 34 and key 37 is inserted in the casing 70, with the disk 34 inside the recess 29 and the upper surface of the disk in contact with the primary seat 31 formed by the upper surface of the recess 29. The spindle section 33 is secured to the casing 70 by the bush 22 so as to retain the disk 34 inside the recess 29 without applying any force to the disk 34 against the primary seat 31. As described above, the exact force required to press the disk 34 against the seat 31 is supplied by the pressure of the fluid flow itself. When the disk 34 is inserted in the recess 29 the lower surface of the disk 34 is coplanar with the lower surface of the casing 70.

The key section 37 of the spindle, when placed in the bore 21 of the plunger shank D, will transmit rotary motion to the plunger shank D in order to move axially to close or open the valve by means of the closure member B, without the spindle being affected by any axial load. Hence, when the plunger is moving axially, the disk 34 will always remain inside the recess 29 without moving away from or towards the primary seat 31.

It is to be noted that in operation, any axial friction between the spindle key 37 and the tee way 21 will be relatively low, and insufficient to exert any significant axial force on the key 37 and hence on the spindle and in particular on the disk 34.

It is also to be noted that the spring 42 is provided only to ensure that the flexible member 64 remains currently in place. This spring is not required to exert any sealing pressure and therefore can be relatively weak.

It will be understood that FIGS. 1 and 2 show a particular valve construction by way of example only. Numerous variations and modifications in constructional details are possible within the scope of the invention.

For example, a one-piece valve body can be used, the cap nut can be replaced by other retaining means, the connection between the plunger head B and the plunger screw can be of any suitable form provided that it permits relative rotation and enables the plunger head to seat accurately in and around the recess.

Further, the valve spindle can be arranged obliquely or even parallel relative to the general direction of flow through the valve body, the valve seat or recess being correspondingly placed and oriented within the valve body.

The above valve assembly can stop substantive gas or liquid flow whilst preventing leakage along the spindle.

Since no packing is used in the advancement screw or spindle, high actuating force is unnecessary. The assembly can be operated with a minimum of force to contain pressures of hundreds or even thousands of pounds per square inch.

The unit can provide superior performance, efficiency and reliability, in many cases at less than the cost of its conventional counterparts. It is designed to control fluid or gas of any quality such as petroleum, chemical liquid (air/gas) in various temperatures whereas conventional valves are individually designed for such specific applications.

The unit is capable of withstanding all pressure levels (extreme low to ultra high) without requiring any modification to its original elements, whereas sealing materials of conventional valves are only designed to meet specific demands, for example sealing materials used in low pressure valves like in water mains are not suitable for high pressure valves used in oil, gas or any other high pressure pipelines.

As no mechanical pressure is required to press the valve plunger head against the valve seat, and no spindle packing is used, the spindle turns smoothly and easily.

The unit requires minimum effort to operate regardless of its size and the pressure to which it is subjected whereas operation of conventional valves is affected by the size of the valve and the pressure for example medium or high pressure valves of average size do not operate effectively without the aid of actuators.

The unit is maintenance free, this means that it can be operated as often as necessary without causing any damage to the valve and its elements, whereas conventional valves require constant attention before, during and after their operation, e.g. for compressing the packing material/element(s) after the valve is operated, or replacing the sealing materials for different application of the valve etc. in order to keep the system in a fair working order.

The unit, in all circumstances such as unexpected change in temperature, pressure, consistency of the flow etc, will retain the most vital safety factor of being absolutely leakage-free throughout the operation.

Valves embodying the invention can be used, inter alia, as domestic taps and stopcocks, and industrially as l.p. or h.p. control valves.

Figure 3:
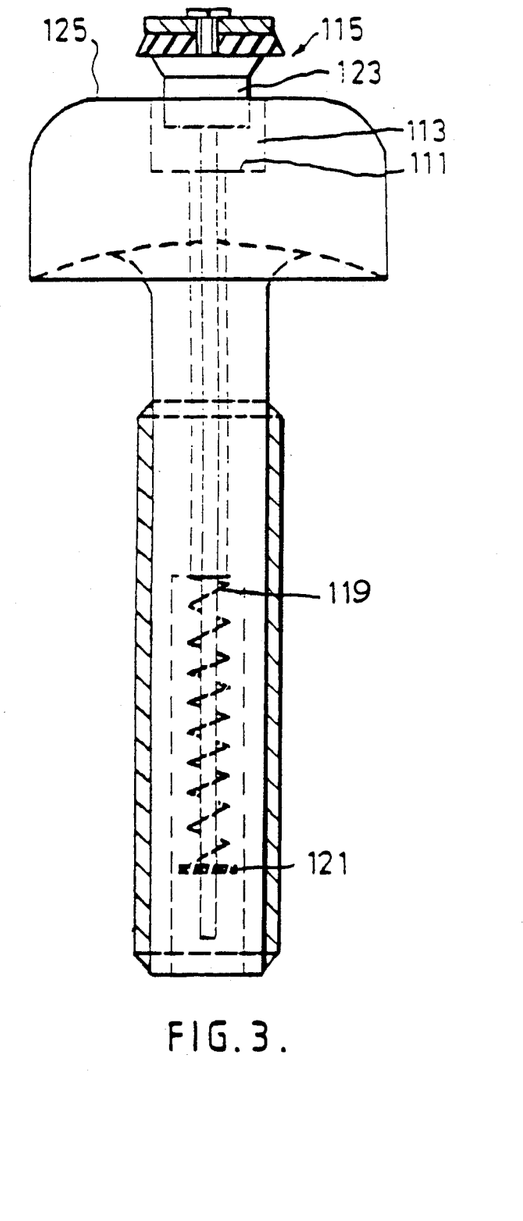
FIG. 3 shows a cross-sectional view of a non-return valve.
Figure 4:
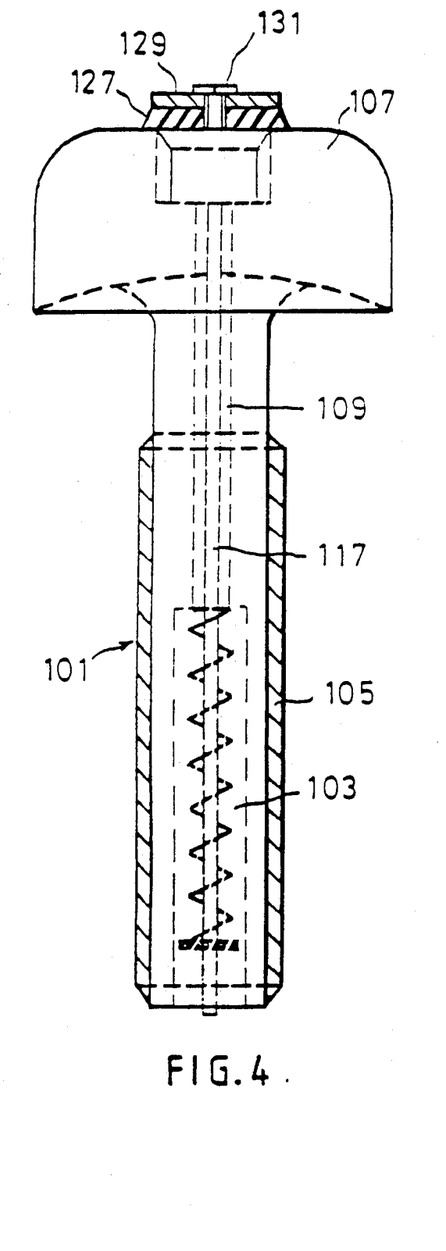
FIG. 4 shows the valve of FIG. 3, closed.

Seals embodying the invention have a wide range of applications. One of these is illustrated by FIGS. 3 and 4, which show a transfer valve or non-return valve for controlling the flow of a gas under pressure into a pressurized container.

The valve comprises a stem 101 containing an inlet duct 103. The stem may have external screw threads 105, to enable a supply pipe to be attached. The valve also has a head 107 to be inserted in or attached to the pressurized vessel or chamber, into which the pressurized gas is to be supplied.

From the inlet duct 103, a somewhat narrower duct 109 extends through the stem and through the head, to a seat 111 at the base of a recess 113 formed in the surface of the head furthest from the inlet to the valve stem.

A valve closure member 115 is located in the recess 113 and is attached to or integral with a pin 117 which extends through the ducts 109 and 105. At the other end of the pin, a compression spring 119 encircles the pin and acts between an abutment 121 provided on the pin, and a shoulder 123 where the duct 103 merges with the duct 109. This spring pulls the closure member 115 lightly against the seat 111.

The closure member 115 comprises a metal primary seal 123 having a thickness equal to the depth of the recess 113 and having smooth plane parallel upper and lower surfaces, the lower surface facing and being parallel to the smooth plane surface of the seat 111. Thus, when the closure member is fully seated in the recess 113, its upper surface is coplanar with the surface 125 of the head 107.

A secondary seal member 127 in the form of a flexible disc e.g. of rubber is held against the upper surface of the primary seal 123 by a washer 129 and a flange 131 provided on the end of the valve pin 117, or alternatively integral with the primary seal 123. The secondary seal 127 bridges the very narrow gap between the internal surface of the recess 113 and external surface of the primary seal 123 and rests against the latter and the seat surface 125 of the valve head when the valve is closed, as shown in FIG. 4.

The closure member closes the valve in a manner analogous to that of the valve head or plunger B in the valve of FIG. 1.

When gas under pressure is to be fed into the container to which the valve is fitted, the pressurized gas is supplied to the bore 103 and acts on the underside of the primary seal 123. When the resulting force on the primary seal exceeds the opposing force due to the pressure in the container, together with the opposing force due to the spring 119, the closure member 115 will lift and allow the pressurized gas to enter the container. When the in-flow ceases or drops to a lower pressure, the valve will re-close.

A shoulder may be provided in the bore 103 facing the abutment 121 to limit the opening movement, so that the seal member 123 can not completely leave the recess 113 and therefore cannot be damaged by fouling the lip of the recess.

Because the closure embodying the invention provides excellent sealing without any need for the application of a large mechanical force to the closure member, the closing spring 119 can be relatively weak, thereby making the valve much easier to use than conventional valves.

It will be understood that a similar structure, but using a stronger spring, can be used as a safety or pressure relief valve.

The invention has numerous other applications.

For example, closure members analogous to the plunger head B of FIG. 1, or the closure member 115 in FIGS. 3 and 4, can be used as seals for containers, hatches, manholes, submarine closures, and so on, e.g. with the primary seal element (9,123) constituting the hatch. When the closure is used as a submarine closure or a pressure closure or hatch, its self-sealing and self-energising action eliminate any need for high-powered closing and pressing means.

Analogous seals can be used for sealing the spindles of gate valves, butterfly valves, ball valves, etc.

Seals analogous to those of the spindle seal in FIGS. 1 and 2 can be used for sealing rotary shafts of various kinds, for example propeller shafts, as well as valve spindles e.g. of gate valves, ball valves, butterfly valves.

As already mentioned, in the case of a rotary seal it is necessary to ensure that the seal elements are not subjected to axial forces and in particular, that the components corresponding to the components 34, 70 in FIG. 2 are not subjected to any significant axial force of approach or separation. Therefore, even in a situation where is there is no intentional axial movement between the shaft or spindle and a valve ball or other component connected to it, it will often be desirable to provide a rotation-transmitting but axially slidable coupling to ensure that no axial force is transmitted to the seal elements.

Figure 5:
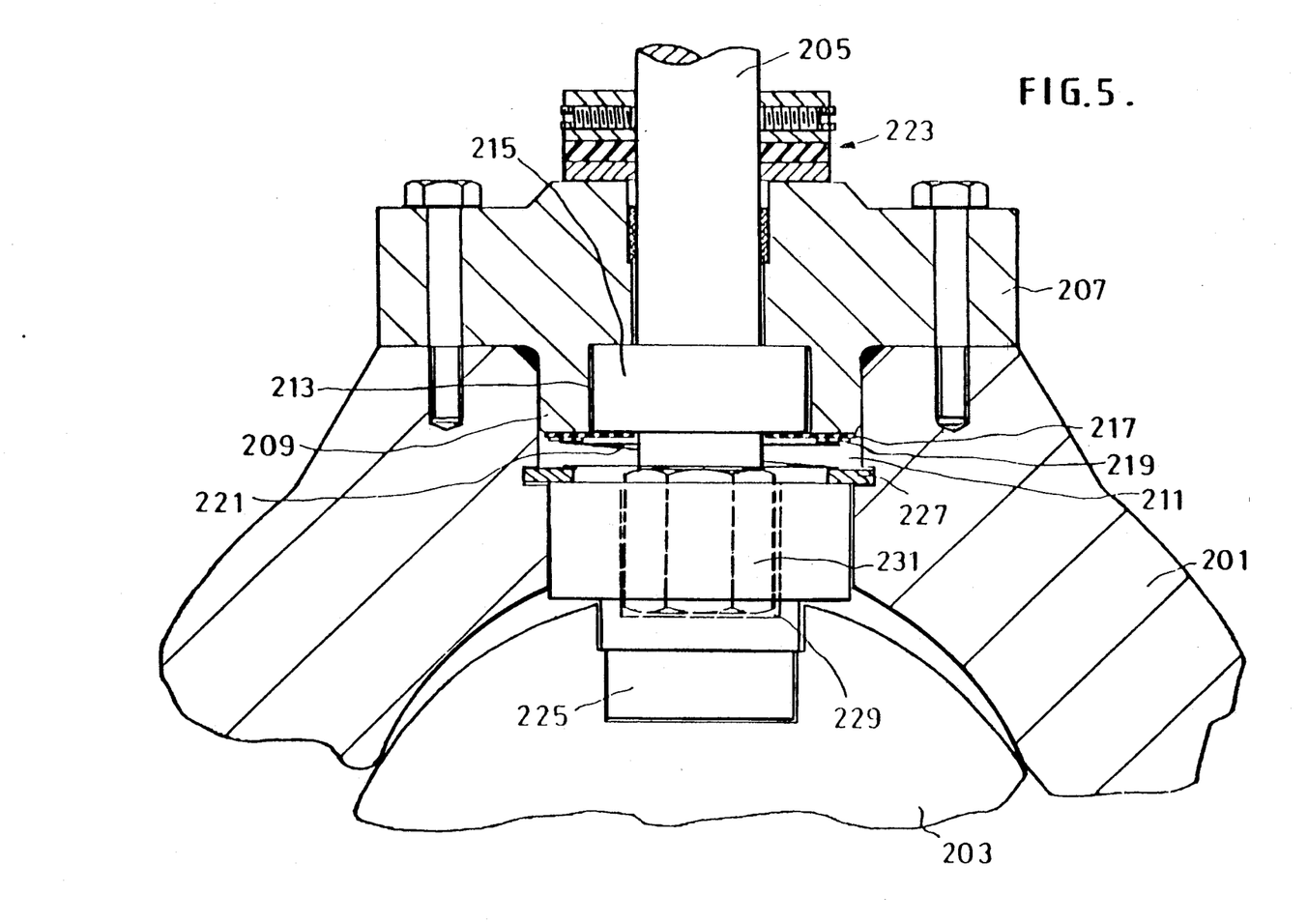
FIG. 5 shows part of a ball valve.

Thus, for example, FIG. 5 shows part of a ball valve comprising a valve body 201 accommodating an essentially conventional valve ball 203 rotatable by a spindle 205 secured in a top plate 207 fixed to the valve body by screws.

The underside of the plate 207 has a neck 209 which projects into a bore 211 in the top of the valve body. The neck 209 has in its underside a recess 213 which accommodates a primary seal element 215 in the form of a disk, flange or collar on the spindle 205. A flexible rubber seal ring 217 is pressed onto the lower coplanar surfaces of the neck and the seal element 215 by a metal ring 219 and a weak compression spring 221. These components form a rotary seal analogous to that already described with reference to FIGS. 1 and 2. The spindle is located in the top plate 207 by an assembly 223 corresponding to the components 22–25 in FIG. 2.

The valve ball 203 has a driver 225 coaxial with the bore 211 and with the spindle 205, and retained in the bore 211 by a collar, split ring or the like 227 seated in a circumferential recess in the bore 211.

In the upper side of the driver 225 is a hexagonal keyway 229. A hexagonal key 231 integral with or attached to the lower end of the spindle 205 is seated in the keyway 229, so that the valve ball 203 can be rotated by rotation of the spindle 205.

In the case of a ball valve (and also for example in the case of a butterfly valve), the valve ball or butterfly inevitably undergoes a certain amount of axial movement in operation, particularly as wear progresses. If the valve ball or butterfly wake directly coupled to the spindle, such movements or corresponding forces would be transmitted to the spindle and therefore to the sealing element 215, impairing the operation and longevity of the seal.

The tee 231 and keyway 229 decouple the spindle and therefore the seal from the valve ball, in respect of axial movement and forces, so that the seal is not impaired, nor is the force required to operate the spindle increased, by axial movements or forces due to the valve ball.

This has the further advantage that operational wear on the ball and its seatings will in general be reduced. The valve ball (or other valve member in the case of a butterfly valve or gate valve) can effectively "float" relative to the spindle, which can make operation easier, reduce wear and enhance the sealing performance of valve member.

Closures embodying the invention can be provided as initial equipment, or can be retrofitted to existing valves and in other circumstances.

For example, a conventional ball valve can be modified by the addition of the driver 225 and the spindle seal according to the invention. A plug valve can be modified to incorporate a spindle seal of the invention by replacement of the valve top and provision of a keyway in the valve screw (if not already present).

A valve can be retrofitted with a plunger head B as in FIG. 1, by substituting this head for a conventional plunger head and, if necessary, providing a mating recess at the valve outlet opening. This latter modification can be made for example by inserting a bush or liner into the existing outlet opening of the valve.

The mating metal surfaces of the valve sealing members and seats, in particular the base of the recess and the mating surface of the primary sealing element, need to have a good mechanical finish, preferably polished, but they do not need to have a fully precision or high-gloss optical finish, nor is it necessary to provide surface finishing coatings, unless these are required for other purposes for example chemical resistance or friction reduction. Normally, surfaces finished according to good work shop practice will provide satisfactory sealing. It is important that the respective surfaces of the rigid primary seal and of the secondary seat should be accurately coplanar, when the seal is closed and that the primary and secondary seats are parallel. The mating surfaces may be interrupted by grooves, to accommodate particles in the fluid flow and prevent these from impairing the integrity of the seal.

The seat and closure members can be made in any convenient way. However, it is particularly convenient to ensure coplanarity, by inserting the primary seal member (at least roughly finished) in the recess defining the primary seat, and then simultaneously machining the remaining exposed surfaces of the primary valve member and the secondary seating surface.

In the case of a plunger or plug-type seal such as B in FIG. 1, or in FIGS. 3 and 4, it may be desirable to secure the soft secondary seal to the retaining member 15 or 129, and/or to the primary sealing element 9 or 123, for example by an adhesive. It is also desirable to minimize the area of the secondary seal exposed to the fluid pressure, to minimize any risk of deformation of or damage to the secondary seal when the valve opens against fluid pressure or against fluid flow, as in the valve of FIG. 1.

In the case a rotary seal, for example the spindle seal in FIG. 1, the pressure between the rotating member (the primary seal) and the stationary member (the primary seat) is relatively small, so that there is only low friction and little if any galling at the metal/metal interface between these member.

In the described seals or closures, all the sealing surfaces are flat, planar and parallel, and the deformable secondary sealing element is flat.

I claim:

1. A closure for a gas or liquid system, capable of use as a stop valve component over a wide range of pressures in the system and as an antileakage seal, and comprising an outlet for the gas or liquid, and a closure element locatable to seat and seal within and around the said outlet, in which:

the outlet comprises a shoulder recess formed in a sealing surface, the recess having a base defining an opening and the said base and sealing surface being parallel and at accurately predetermined spacing from one another, and the closure element comprises (a) a rigid disc-like member of accurately predetermined thickness having parallel inner and outer faces and adapted to lie within the recess with the outer face exactly coplanar with the said sealing surface and the inner face abutting said base and (b) a flat sheet like deformable seal, and means holding the deformable seal in a fixed relation to the disc-like member so that it lies against the seal outer face of the disc-like member and has an annular portion extending beyond the disc-like member, said annular portion not being subject to mechanical clamping but sealing against the sealing surface under the pressure in the system when the disc-like member is in the recess.

2. A closure for a fluid system usable over a wide range of pressures in the system comprising a casing member having a sealing surface defining a shoulder recess, which sealing surface faces outwardly of the recess to be subjected to the pressure of fluid of the system, the recess having a base defining an opening through the casing member, the base and sealing surface being parallel to one another and spaced by an accurately predetermined spacing, and a closure element comprising a rigid solid first disk-like sealing member of accurately predetermined thickness having a first face and a second face, the first disk-like member being dimensioned for fitting within the recess with the first face substantially coincident with the base of the recess, and a sheet like deformable second sealing member having a sealing face, the second sealing member being held in substantially fixed relationship to the disk-like member such that when the first sealing member is in the recess the sealing face of the second sealing member seals against the second face of the first sealing member and against the said sealing surface of the casing member, with the deformable sealing member being subjected to the pressure of the fluid of the system urging it into engagement with the said sealing surface but not being mechanically clamped thereto.

3. A closure according to claim 2, in which at least the base of the recess and the first face of the first sealing member are each of a smooth surface.

4. A closure according to claim 2, in which the casing member is adapted to contain the fluid under pressure, the recess and sealing surface of the casing member face inwardly of the casing, and the opening is a fluid outlet from the casing to be sealed by the closure element.

5. A closure according to claim 2, in which the closure element is a valve closure element mounted on an axially movable operating member and including operating means for moving the operating member axially to move the closure element into the recess to close the opening, and in which the second deformable sealing member is attached to the first sealing member to move therewith.

6. A closure according to claim 5, in which the first sealing member has a leading end and a trailing end, the leading end has a smaller cross sectional area than that of the trailing end and the trailing end is a close fit at the top of the recess.

7. A closure according to claim 5, in which the valve operating member is coupled to a rotatable spindle extending through the casing by a coupling means with effectively couples the spindle and operating member for rotation together but allows axial movement therebetween, and in which the closure element is coupled to the operating member by a further coupling which allows relative rotation and limited axial play therebetween.

8. A closure according to claim 6, in which the valve operating member is coupled to a rotatable spindle extending through the casing by a coupling means which effectively couples the spindle and operating member for rotation together but allows axial movement therebetween, and in which the closure element is coupled to the operating member by a further coupling which allows relative rotation and limited axial play therebetween.

9. A closure according to claim 2, in which the first sealing member is a flange integral with a spindle which extends through the opening in the base of the recess, the flange being a close fit in the recess so that its second face is exactly coplanar with said sealing surface, the spindle and first sealing member being rotatable in the recess and restrained from axial movement, and including means locating the second sealing member against the said sealing surface of the casing member with the spindle extending therethrough and rotatable therein, thereby the closure forms an anti-leak seal around the spindle.

10. A closure according to claim 9, including a valve closure member and an operating member for moving the valve closure member between open and closed positions, coupling means coupling the spindle and the valve operating member and in which the coupling causes rotation of the spindle to be transmitted to the operating member but allows axial play between the spindle and operating member.

11. A valve including a casing member for a fluid system under pressure, the casing member having first and second sealing surfaces defining respectively first and second shoulder recesses, each recess facing inwardly of the casing, the first and second recesses having respectively first and second bases respectively defining first and second openings through the casing member, first and second closure elements for closing respectively the first and second openings, the first closure element being a valve closure element comprising a rigid solid first disk-like sealing member having a first face and a second face and dimensioned for fitting within the first recess with the first face substantially coincident with the first base, and a sheet like deformable second sealing member having a sealing face, the first and second sealing members being mounted for movement together on an axially movable valve operating member, operating means for moving the valve operating member axially to move the first sealing member into or out of the recess, the second sealing member being located such that when the first sealing member is fully located in the first recess the second sealing member will be in sealing engagement with both the second face of the first sealing member and with the first sealing surface to seal the first opening when the second sealing member is subjected to pressure of a fluid within the casing member, the operating means comprising a rotatable spindle and coupling means which effectively couples the spindle and the valve operating member so that rotation of the spindle causes said axial movement of the operating member, the spindle extending through the second opening, the second closure element comprising a flange integral with the spindle, the flange having accurately spaced inner and outer surfaces, the flange being rotatably located in the recess as a close fit so that its inner face bears against the second base and its outer face is accurately coplanar with the second sealing surface, means restraining the flange against axial movement out of the recess, the second closure element including a third deformable sheet-like sealing member located against the second sealing surface and the outer face of the flange, the spindle extending through the third sealing member and being rotatable therein, whereby the second closure element forms an anti-leak seal around the spindle.

12. A closure according to claim 5, including a non-return valve having a stem defining an inlet duct adapted to form the closure of a casing member, the stem defining the recess for opening into the casing member, and in which the axially movable operating member is a spindle, extending through the stem.

13. A closure according to claim 6, including a non-return valve having a stem defining an inlet duct adapted to form the closure of a casing member, the stem defining the recess for opening into the casing member, and in which the axially movable operating member is a spindle extending through the stem.

14. A closure according to claim 9, including bearing means by which the spindle engages the casing and in which the bearing is substantially unpacked so that the frictional resistance to turning of the spindle is minimized.

15. A closure according to claim 11, including bearing means by which the spindle engages the casing and in which the bearing is substantially unpacked so that the frictional resistance to turning of the spindle is minimized.

16. A closure according to claim 9, in which the valve operating member is threaded and the casing member includes a threaded part to be engaged by the threaded operating member and in which the engagement between the threaded operating member and casing and between the spindle and the casing is substantially unpacked.

17. A closure according to claim 11, in which the valve operating member is threaded and the casing member includes a threaded part to be engaged by the threaded valve operating member and in which the engagement between the threaded operating member and casing and between the spindle and the casing is substantially unpacked.

18. A closure according to claim 9 in which the means locating the second sealing member against the sealing surface comprises a weak compressing spring.

* * * * *